(12) United States Patent
Matsuoka et al.

(10) Patent No.: US 6,880,669 B2
(45) Date of Patent: Apr. 19, 2005

(54) ELECTRIC POWER STEERING APPARATUS

(75) Inventors: Yuki Matsuoka, Kashiwara (JP); Yoshifumi Obata, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/328,176

(22) Filed: Dec. 26, 2002

(65) Prior Publication Data
US 2003/0127278 A1 Jul. 10, 2003

(30) Foreign Application Priority Data
Dec. 26, 2001 (JP) ........................................ 2001-394393

(51) Int. Cl.[7] .............................................. B62D 5/04
(52) U.S. Cl. ......................... 180/446; 701/41; 701/42
(58) Field of Search ................................. 180/443–446; 364/424.051, 424.052; 701/41–45

(56) References Cited

U.S. PATENT DOCUMENTS

| | | | | |
|---|---|---|---|---|
| 4,771,843 A | * | 9/1988 | Shimizu | 180/446 |
| 4,771,845 A | * | 9/1988 | Shimizu | 180/446 |
| 4,789,040 A | * | 12/1988 | Morishita et al. | 180/446 |
| 4,869,334 A | * | 9/1989 | Marumoto et al. | 180/446 |
| 5,743,351 A | * | 4/1998 | McLaughlin | 180/446 |
| 5,992,556 A | * | 11/1999 | Miller | 180/446 |
| 6,013,994 A | | 1/2000 | Endo et al. | |
| 6,046,560 A | * | 4/2000 | Lu et al. | 318/432 |
| 6,155,377 A | * | 12/2000 | Tokunaga et al. | 180/446 |
| 6,470,995 B1 | * | 10/2002 | Mukai et al. | 180/446 |

FOREIGN PATENT DOCUMENTS

| | | |
|---|---|---|
| EP | 0 922 626 | 6/1999 |
| EP | 0 943 528 | 9/1999 |
| EP | 1 057 715 | 12/2000 |

* cited by examiner

Primary Examiner—Lesley D. Morris
Assistant Examiner—L. Lum
(74) Attorney, Agent, or Firm—Rabin & Berdo, P.C.

(57) ABSTRACT

An electric power steering apparatus that performs steering assist by transmitting a driving force produced by an electric motor to a steering mechanism. The electric power steering apparatus is provided with a driving target value setting section for setting a driving target value of the electric motor, a first factor setting section for setting a first factor on the basis of the driving target value, a temperature sensor for sensing the ambient temperature of the electric power steering apparatus, a second factor setting section for setting a second factor on the basis of an output of the temperature sensing section, a driving target value correction section for correcting a driving target value on the basis of the first and second factors, and a motor driver for driving the electric motor on the basis of the driving target value thus corrected.

6 Claims, 3 Drawing Sheets

ELECTRIC POWER STEERING APPARATUS

BACKGROUND OF THE INVENTION

1. Field of the Invention

The present invention relates to an electric power steering apparatus so constructed as to perform steering assist by transmitting a driving force produced by an electric motor to a steering mechanism.

2. Description of Related Art

Conventionally, electric power steering apparatuses that perform steering assist by transmitting torques produced by electric motors to steering mechanisms in vehicles have been employed. The electric motors are driven and controlled on the basis of target currents determined depending on steering torques applied to steering wheels and vehicle speeds.

However, the efficiencies of the steering mechanisms change depending on temperatures and required axial forces (forces in the axial direction which should be produced by rack shafts of the steering mechanisms). Notwithstanding, the changes in the efficiencies are not taken into consideration in the conventional electric power steering apparatuses. Consequently, steering assist forces may, in some cases, be excessive or deficient depending on the ambient temperatures of the steering mechanisms and the magnitudes of loads. Accordingly, good steering feelings may not be obtained.

SUMMARY OF THE INVENTION

An object of the present invention is to solve the above-mentioned technical problem and to provide an electric power steering apparatus capable of realizing a good steering feeling irrespective of the temperature or the magnitude of a load.

An electric power steering apparatus according to the present invention is an apparatus that performs steering assist by transmitting a driving force produced by an electric motor to a steering mechanism. The apparatus comprises a driving target value setting section for setting a driving target value of the electric motor; a first factor setting section for setting a first factor on the basis of the driving target value set by the driving target value setting section; a temperature sensor for sensing the ambient temperature of the electric power steering apparatus including the steering mechanism; a second factor setting section for setting a second factor on the basis of an output of the temperature sensor; a driving target value correction section for correcting a driving target value set by the driving target value setting section on the basis of the first and second factors set by the first factor setting section and the second factor setting section; and a motor driver for driving the electric motor on the basis of the driving target value corrected by the driving target value correction section.

According to the present invention, the driving target value of the electric motor is corrected on the basis of the first factor corresponding to the driving target value and the second factor corresponding to the ambient temperature of the steering mechanism. The electric motor is driven on the basis of the corrected driving target value. Consequently, it is possible to compensate for the effects of the change in the efficiency of the steering mechanism depending on the driving target value and the change in the efficiency of the steering mechanism depending on the temperature. Accordingly, the steering assist force which is not excessive and deficient can be applied to the steering mechanism irrespective of the ambient temperature of the steering mechanism or the magnitude of a load. Consequently, a good steering feeling can be realized.

The first factor setting section may be one for setting, as the first factor, the efficiency of the steering mechanism which changes depending on a rack axial force corresponding to the driving target value.

According to the construction, the driving target value corresponds to the required rack shaft. Accordingly, the efficiency of the steering mechanism which changes depending on the rack axial force corresponding to the driving target value is set as the first factor, thereby making it possible to solve the excess and deficiency of the steering assist force depending on the magnitude of the rack axial force.

The second factor setting section may be one for setting, as the second factor, the efficiency of the steering mechanism which changes depending on the temperature.

According to the construction, the good steering assist can be realized by compensating for the variation in the efficiency of the steering mechanism depending on the change in the ambient temperature of the steering mechanism.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
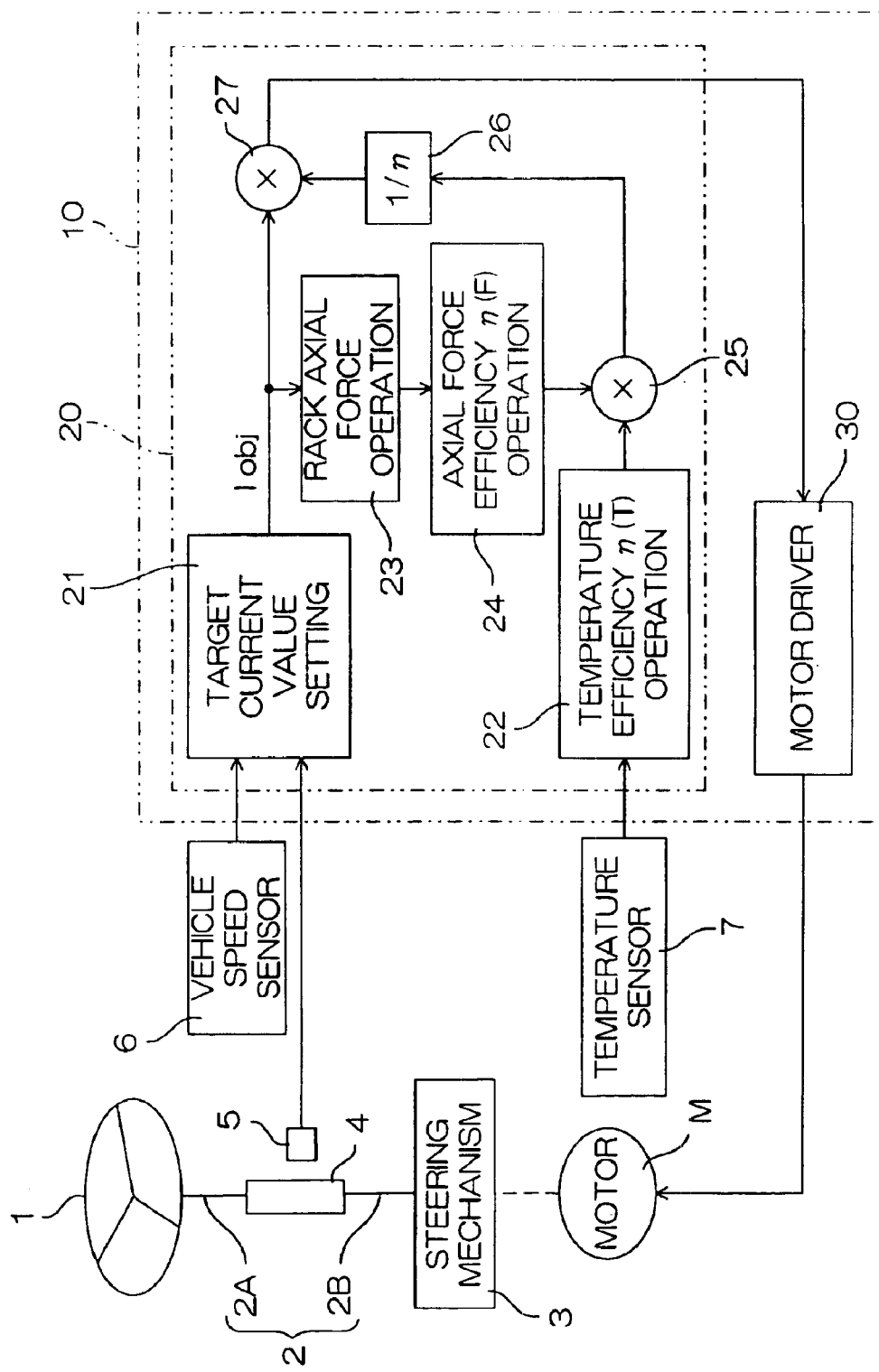
FIG. 1 is a block diagram showing the electrical configuration of an electric power steering apparatus according to an embodiment of the present invention.

FIG. 1 is a block diagram showing the electrical configuration of an electric power steering apparatus according to an embodiment of the present invention. A steering torque applied to a steering wheel 1 serving as an operation member is mechanically transmitted to a steering mechanism 3 including a rack shaft through a steering shaft 2. A steering assist force is transmitted to the steering mechanism 3 from an electric motor M.

The steering shaft 2 is divided into an input shaft 2A coupled to the steering wheel 1 and an output shaft 2B coupled to the steering mechanism 3. The input shaft 2A and the output shaft 2B are connected to each other by a torsion bar 4. The torsion bar 4 causes distortion depending on the steering torque. The direction and the amount of the distortion are sensed by a torque sensor 5.

The torque sensor 5 is composed of a magnetic torque sensor that senses a magnetoresistance which changes depending on the change in the positional relationship in the direction of rotation between the input shaft 2A and the output shaft 2B, for example. An output signal of the torque sensor 5 is inputted to a controller 10 (ECU).

Output signals of a vehicle speed sensor 6 for sensing the vehicle speed of a vehicle equipped with the electric power steering apparatus and a temperature sensor 7 for sensing the ambient temperature of the electric power steering apparatus are further inputted to a controller 10.

The controller 10 determines a target current value of the electric motor M depending on the steering torque sensed by the torque sensor 5 and the vehicle speed sensed by the vehicle speed sensor 6, to drive and control the electric motor M such that a steering assist force corresponding to the steering torque or the like is applied to the steering mechanism 3.

The controller 10 has a microcomputer 20 and a motor driver 30 for driving the electric motor M on the basis of a control signal from the microcomputer 20.

The microcomputer 20 substantially has a plurality of functional processing sections realized by performing program processing. Specifically, the microcomputer 20 has a target current value setting section 21 for setting a target current value Iobj of the electric motor M on the basis of outputs of the torque sensor 5 and the vehicle sensor 6, a temperature efficiency operation section 22 for finding the temperature efficiency $\eta$ (T) of the steering mechanism 3 on the basis of an output of the temperature sensor 7, a rack axial force operation section 23 for operating a rack axial force to be produced by the rack shaft of the steering mechanism 3 on the basis of the target current value Iobj set by the target current value setting section 21, and an axial force efficiency operation section 24 for finding an axial force efficiency $\eta$ (F), which is the efficiency of the steering mechanism 3, corresponding to the operated rack axial force.

The temperature efficiency $\eta$ (T) and the axial force efficiency $\eta$ (F) are multiplied by a multiplication section 25, thereby finding a general efficiency $\eta$ (=$\eta$ (T)×$\eta$ (F)). The reciprocal 1/$\eta$ of the general efficiency $\eta$ is found by a reciprocal operation section 26. The target current value Iobj is multiplied by the reciprocal 1/$\eta$ by a multiplication section 27. The target current value Iobj is thus corrected, so that the electric motor M is driven and controlled through the motor driver 30 on the basis of the corrected target current value Iobj/$\eta$.

Figure 2:
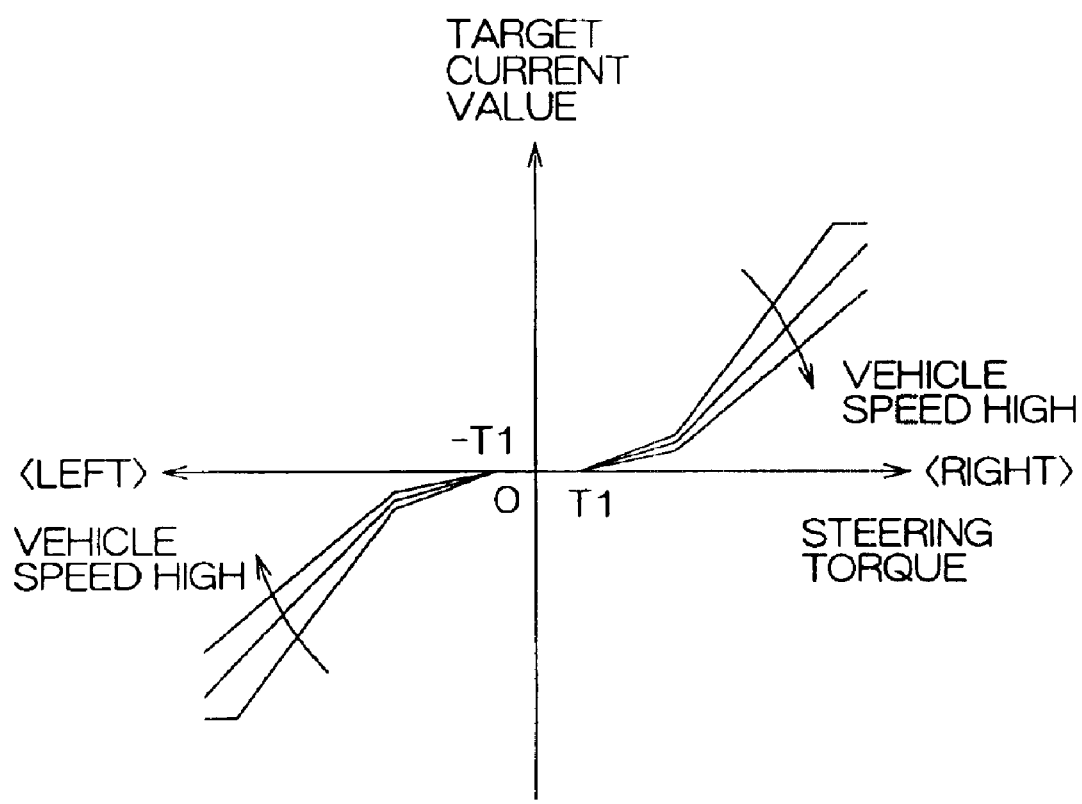
FIG. 2 is a diagram for explaining the function of a target current value setting section, which illustrates the relationship between a steering torque and a target current value.

FIG. 2 is a diagram for explaining the function of the target current value setting section 21, which illustrates the relationship between the steering torque and the target current value Iobj. As the steering torque, a torque for steering in the rightward direction is taken as a positive value, and a torque for steering in the leftward direction is taken as a negative value. The target current value Iobj is a positive value when a steering assist force for steering in the rightward direction should be produced from the electric motor M, while being a negative value when a steering assist force for steering in the leftward direction should be produced from the electric motor M.

The target current value Iobj takes a positive value with respect to the positive value of the steering torque, while taking a negative value with respect to the negative value of the steering torque. When the steering torque takes a very small value in a range of −T1 to T1 (for example, T1=0.4 N·m) (a torque dead zone), the target current value Iobj is zero. The higher the vehicle speed sensed by the vehicle speed sensor 6 is, the smaller the absolute value of the target current value Iobj is set. Consequently, a large steering assist force can be produced at the time of low-speed traveling, while the steering assist force can be reduced at the time of high-speed traveling.

Figure 3:
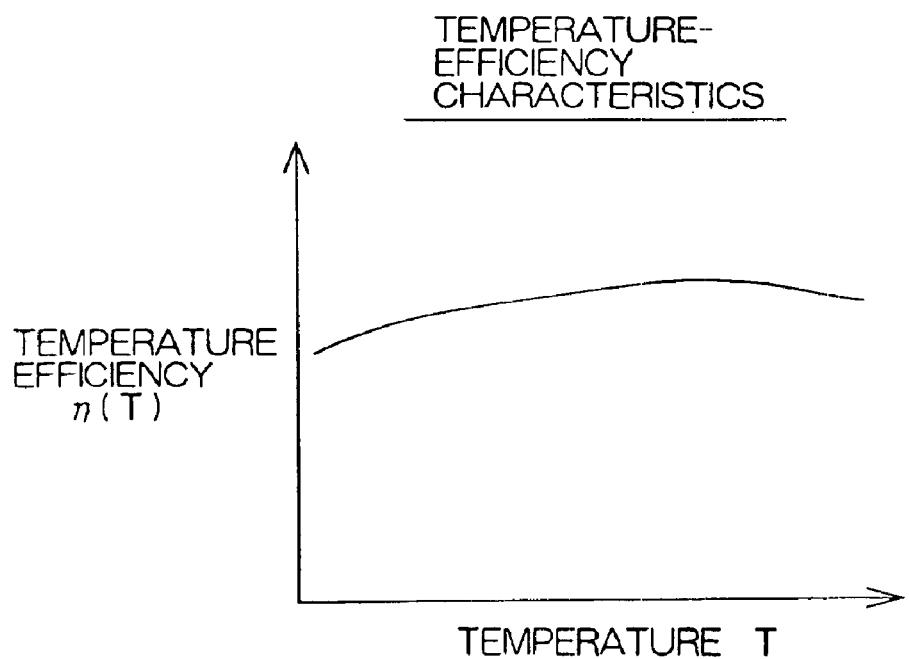
FIG. 3 is a characteristic view showing an example of the relationship between the temperature efficiency and the ambient temperature of a steering mechanism.

FIG. 3 is a characteristic view showing an example of the relationship between the temperature efficiency $\eta$ (T) and the ambient temperature T of the steering mechanism 3. The temperature efficiency operation section 22 outputs the temperature efficiency $\eta$ (T) corresponding to the temperature sensed by the temperature sensor 7 in accordance with the characteristic view as shown in FIG. 3. Specifically, the temperature efficiency $\eta$ (T) of the steering mechanism 3 may be previously found by an experiment, to store the results of the experiment as a table in a memory. In this case, the temperature efficiency operation section 22 determines the temperature efficiency $\eta$ (T) corresponding to the temperature sensed by the temperature sensor 7 by reading out the temperature efficiency $\eta$ (T) from the memory.

Figure 4:
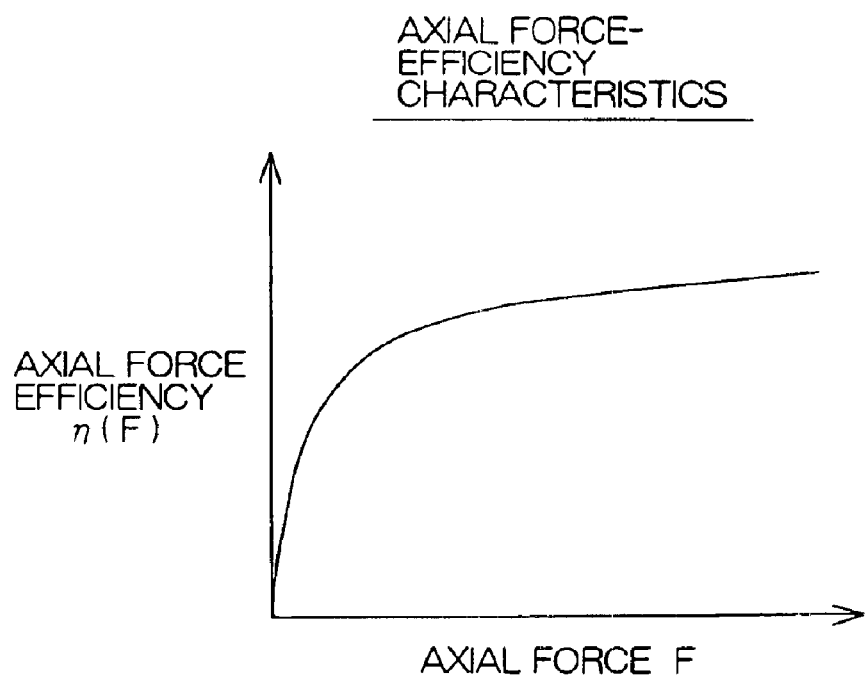
FIG. 4 is a characteristic view showing an example of the relationship between the efficiency of an axial force and a rack axial force.

FIG. 4 is a characteristic view showing an example of the relationship between the axial force efficiency $\eta$ (T) and the rack axial force F. The axial force efficiency operation section 24 outputs the axial force efficiency $\eta$ (F) corresponding to the rack axial force F operated by the rack axial force operation section 23 in accordance with the characteristic view as shown in FIG. 4. Specifically, the efficiency $\eta$ (F) of the steering mechanism 3 corresponding to the required rack axial force F may be previously found by an experiment, to store the results of the experiment as a table in the memory, as in the case of the temperature efficiency $\eta$ (T). In this case, the axial force efficiency operation section 24 reads out from the memory the axial force efficiency $\eta$ (F) corresponding to the rack axial force F operated by the rack axial force operation section 23, to determine the axial force efficiency $\eta$ (F).

By multiplying the target current value Iobj by the reciprocal 1/$\eta$ of the general efficiency $\eta$ ($\eta$ (T)×$\eta$ (F)) to correct the target current value Iobj, the corrected target current value Iobj/$\eta$ is a value capable of compensating for the efficiency of the steering mechanism 3 dependent on the temperature and the rack axial force. Consequently, the electric motor M is driven and controlled on the basis of the corrected target current value Iobj, thereby making it possible to apply a steering assist force which is not excessive and deficient to the steering mechanism without depending on the peripheral temperature or the magnitude of the rack axial force (the magnitude of the load). Consequently, a good steering feeling can be realized.

Although the present invention has been described and illustrated in detail, it is clearly understood that the same is by way of illustration and example only and is not to be taken by way of limitation, the spirit and scope of the present invention being limited only by the terms of the appended claims.

The present invention corresponds to an application No. 2001-394393 filed with the Japanese Patent Office on Dec. 26, 2001, the disclosure of which is hereinto incorporated by reference.

What is claimed is:

1. An electric power steering apparatus that performs steering assist by transmitting a driving force produced by an electric motor to a steering mechanism, comprising:
  a driving target value setting section for setting a driving target value of the electric motor;
  a first factor setting section for setting a first factor on the basis of the driving target value set by the driving target value setting section;
  a temperature sensor for sensing an ambient temperature of the electric power steering apparatus including the steering mechanism;

a second factor setting section for setting a second factor on the basis of an output of the temperature sensor;

a driving target value correction section for correcting the driving target value set by the driving target value setting section on the basis of the first and second factors set by the first factor setting section and the second factor setting section; and a motor driver for driving the electric motor on the basis of the driving target value corrected by the driving target value correction section.

2. The electric power steering apparatus according to claim 1, wherein the first factor setting section sets, as the first factor, an efficiency of the steering mechanism which changes depending on a rack axial force corresponding to the driving target value.

3. The electric power steering apparatus according to claim 1, wherein the second factor setting section sets, as the second factor, an efficiency of the steering mechanism which changes depending on the temperature.

4. The electric power steering apparatus according to claim 2, wherein the second factor setting section sets, as the second factor, an efficiency of the steering mechanism which changes depending on the temperature.

5. The electric power steering apparatus according to claim 1, further comprising:

a torque sensor for sensing steering torque applied to a steering wheel of a vehicle equipped with the electric power steering apparatus and transmitted to the steering mechanism, wherein the driving target value setting section sets the driving target value of the electric motor on the basis of the steering torque sensed by the torque sensor.

6. The electric power steering apparatus according to claim 5, further comprising:

a vehicle speed sensor fur sensing vehicle speed of the vehicle equipped with the electric power steering apparatus, wherein the driving target value setting section sets the driving target value of the electric motor on the basis of the steering torque sensed by the torque sensor and the vehicle speed sensed by the vehicle speed sensor.

* * * * *